(12) United States Patent
Havlir et al.

(10) Patent No.: US 10,353,711 B2
(45) Date of Patent: Jul. 16, 2019

(54) CLAUSE CHAINING FOR CLAUSE-BASED INSTRUCTION EXECUTION

(71) Applicant: Apple Inc., Cupertino, CA (US)

(72) Inventors: Andrew M. Havlir, Orlando, FL (US); Brian K. Reynolds, Austin, TX (US); Liang Xia, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 15/257,386

(22) Filed: Sep. 6, 2016

(65) Prior Publication Data

US 2018/0067748 A1 Mar. 8, 2018

(51) Int. Cl.
*G06F 9/30* (2018.01)
*G06F 9/38* (2018.01)

(52) U.S. Cl.
CPC .......... *G06F 9/3867* (2013.01); *G06F 9/3887* (2013.01)

(58) Field of Classification Search
CPC .............................. G06F 9/3867; G06F 9/3887
See application file for complete search history.

(56) References Cited

U.S. PATENT DOCUMENTS

| | | | |
|---|---|---|---|
| 7,562,263 B1 * | 7/2009 | Engelbrecht | G06F 11/10 714/15 |
| 8,438,370 B1 * | 5/2013 | Budge | G06F 9/3879 712/241 |
| 2009/0210660 A1 * | 8/2009 | Webber | G06F 9/3851 712/205 |
| 2011/0078415 A1 * | 3/2011 | Johnson | G06F 9/30021 712/208 |
| 2012/0131309 A1 | 5/2012 | Johnson et al. | |
| 2015/0019840 A1 | 1/2015 | Anderson et al. | |
| 2015/0035841 A1 | 2/2015 | Havlir et al. | |

* cited by examiner

*Primary Examiner* — Sing-Wai Wu
(74) *Attorney, Agent, or Firm* — Meyertons, Hood, Kivlin, Kowert & Goetzel, P.C.

(57) ABSTRACT

Techniques are disclosed relating to clause-based execution of program instructions, which may be single-instruction multiple data (SIMD) computer instructions. In some embodiments, an apparatus includes execution circuitry configured to receive clauses of instructions and SIMD groups of input data to be operated on by the clauses. In some embodiments, the apparatus further includes one or more storage elements configured to store state information for clauses processed by the execution circuitry. In some embodiments, the apparatus further includes scheduling circuitry configured to send instructions of a first clause and corresponding input data for execution by the execution circuitry and indicate, prior to sending instruction and input data of a second clause to the execution circuitry for execution, whether the second clause and a first clause are assigned to operate on groups of input data corresponding to the same instruction stream. In some embodiments, the apparatus is configured to determine, based on the indication, whether to maintain as valid, for use by the second clause, stored state information for the first clause.

18 Claims, 7 Drawing Sheets

CLAUSE CHAINING FOR CLAUSE-BASED INSTRUCTION EXECUTION

BACKGROUND

Technical Field

This disclosure relates generally to computer processors and more specifically to clause-based execution of program instructions.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors are often included in mobile devices such as cellular phones, wearable devices, etc., where power consumption and processor area are important design concerns.

SUMMARY

Techniques are disclosed relating to clause-based execution of program instructions, which may be single-instruction multiple data (SIMD) computer instructions. In some embodiments, an apparatus includes execution circuitry configured to receive clauses of instructions and groups of input data, where the clauses specify respective sets of operations to be performed on the groups of input data by the execution circuitry. In some embodiments, the groups of input data are SIMD groups that include pointers to multiple sets of input operand values for each of the set of operations. In some embodiments, the execution circuitry is configured to perform, in parallel, operations in the sets of operations using the multiple sets of input operand values.

In some embodiments, the apparatus further includes one or more storage elements configured to store state information for groups of input data based on execution of corresponding clauses by the execution circuitry.

In some embodiments, the apparatus further includes scheduling circuitry configured to send instructions of a first clause and corresponding input data for execution by the execution circuitry. In some embodiments, the scheduling circuitry is configured to indicate, prior to sending instructions and input data a second clause to the execution circuitry for execution, whether the second clause and a first clause are assigned to operate on groups of input data corresponding to the same instruction stream. In some embodiments, the apparatus is configured to determine, based on the indication, whether to maintain as valid, for use by the second clause, stored state information for the first clause in the one or more storage elements.

In some embodiments, the apparatus is configured to flush and invalidate the stored state information if the first and second clauses are assigned to operate on groups of input data corresponding to different instruction streams. In these embodiments, the apparatus is configured to maintain the stored state information as valid for use by the second clause if the first and second clauses are assigned to operate on groups of input data corresponding to the same instruction stream.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1A:
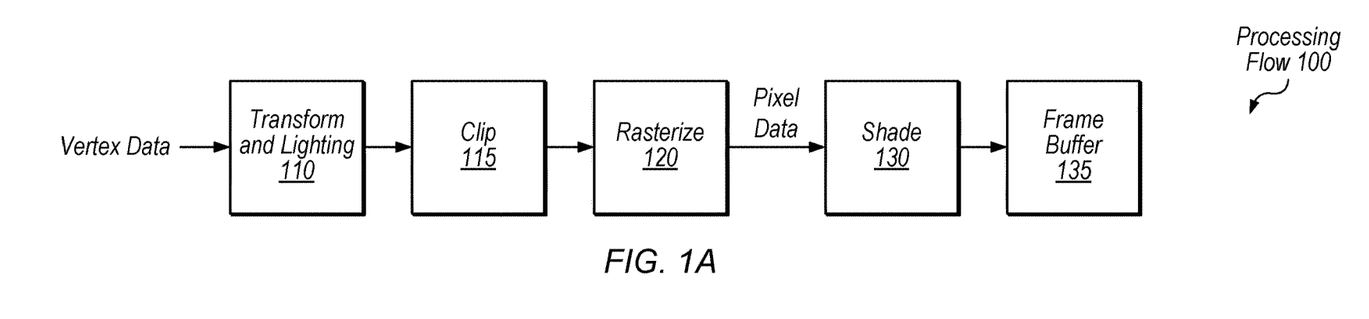
FIG. 1A is a block diagram illustrating an exemplary graphics processing flow.
Figure 1B:
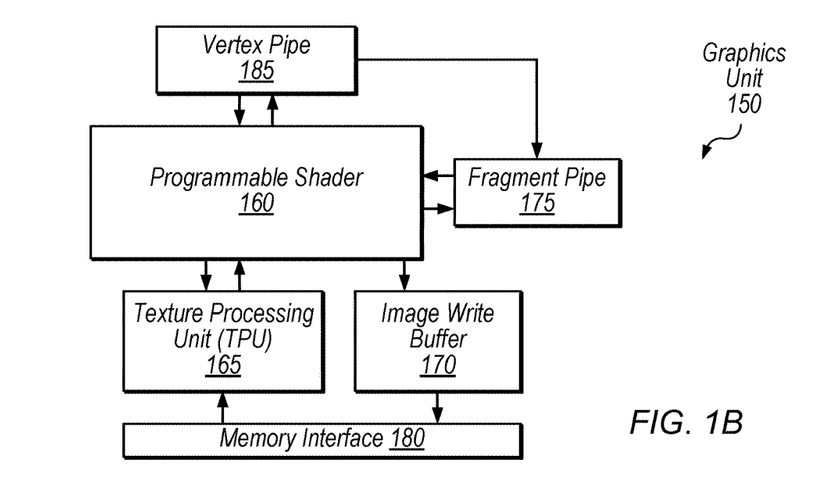
FIG. 1B is a block diagram illustrating one embodiment of a graphics unit.
Figure 5:
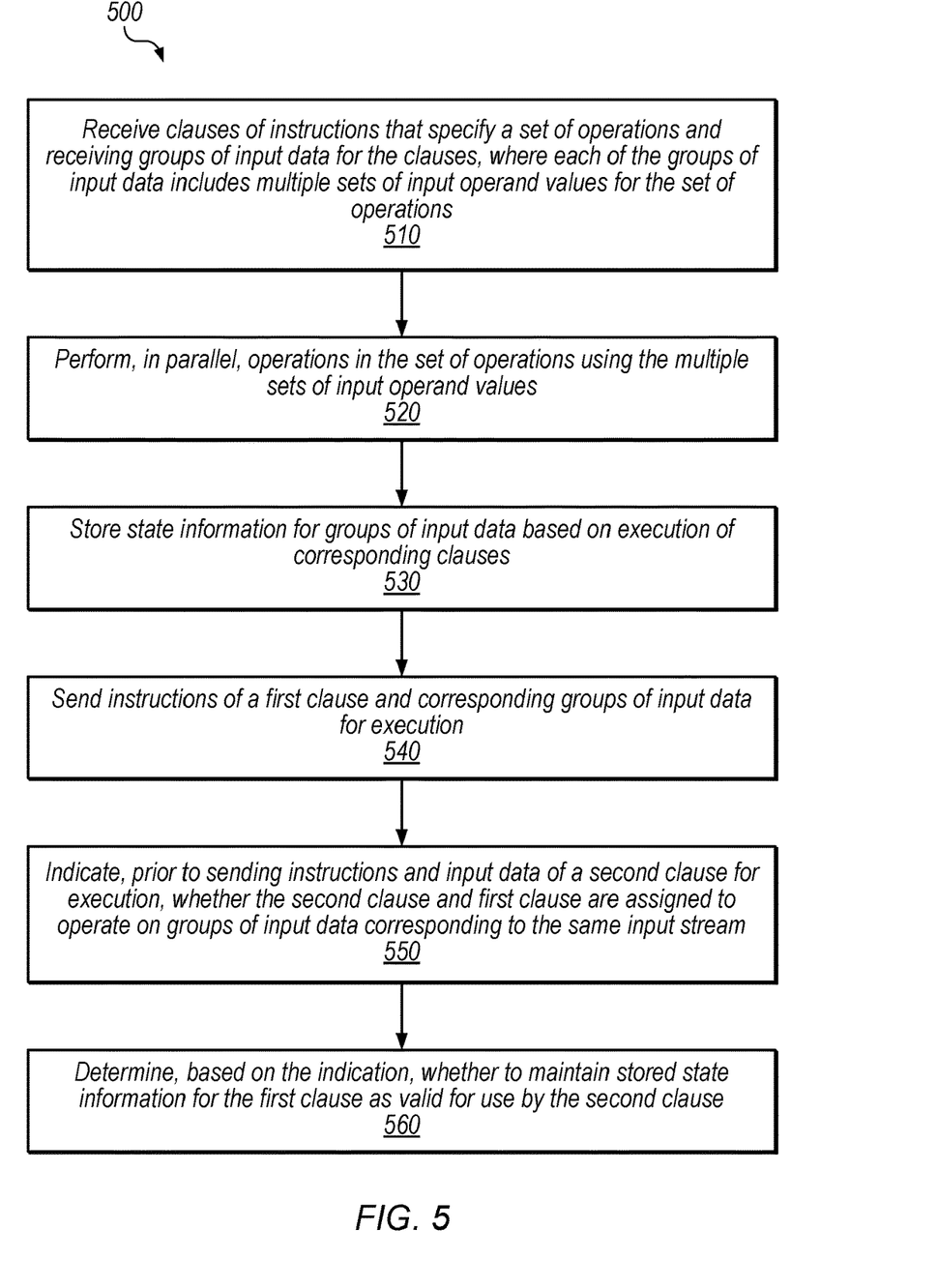
FIG. 5 is a flow diagram illustrating an exemplary method for chaining clauses of instructions, according to some embodiments.
Figure 6:
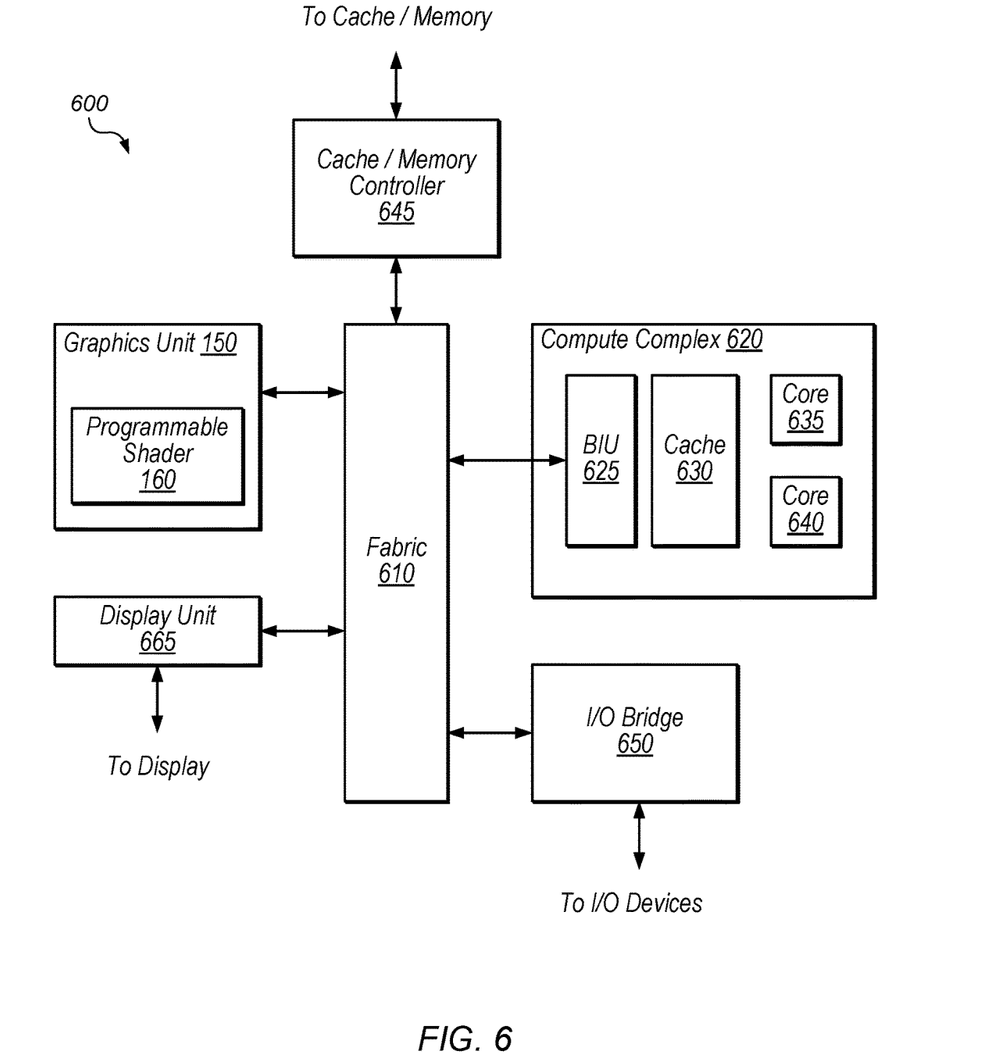
FIG. 6 is a block diagram illustrating one embodiment of a device that includes a graphics unit.
Figure 7:
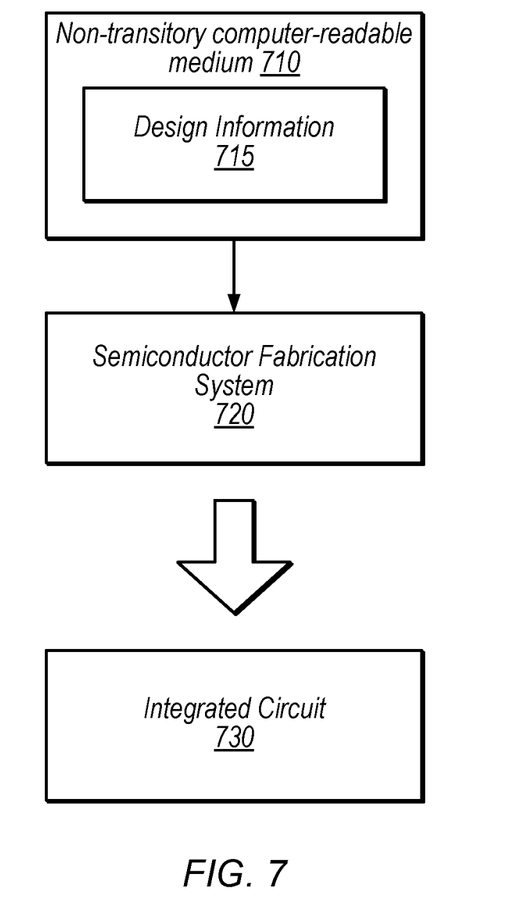
FIG. 7 is a block diagram illustrating an exemplary computer-readable medium, according to some embodiments.

This disclosure initially describes, with reference to FIGS. 1A-1B, an overview of a graphics processing flow and an exemplary graphics unit. Embodiments of a programmable shader configured for clause-based execution are described with reference to FIGS. 2-4. An exemplary method is shown in FIG. 5, an exemplary device is shown in FIG. 6, and an exemplary computer-readable medium is shown in FIG. 7. In some embodiments, state information is either (a) maintained or (b) flushed and invalidated based on whether clauses of instructions assigned to particular execution circuitry are from the same instruction stream. This may reduce flushes which may in turn reduce power consumption while maintaining performance, in some embodiments.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Programmable Shader

Figure 2:
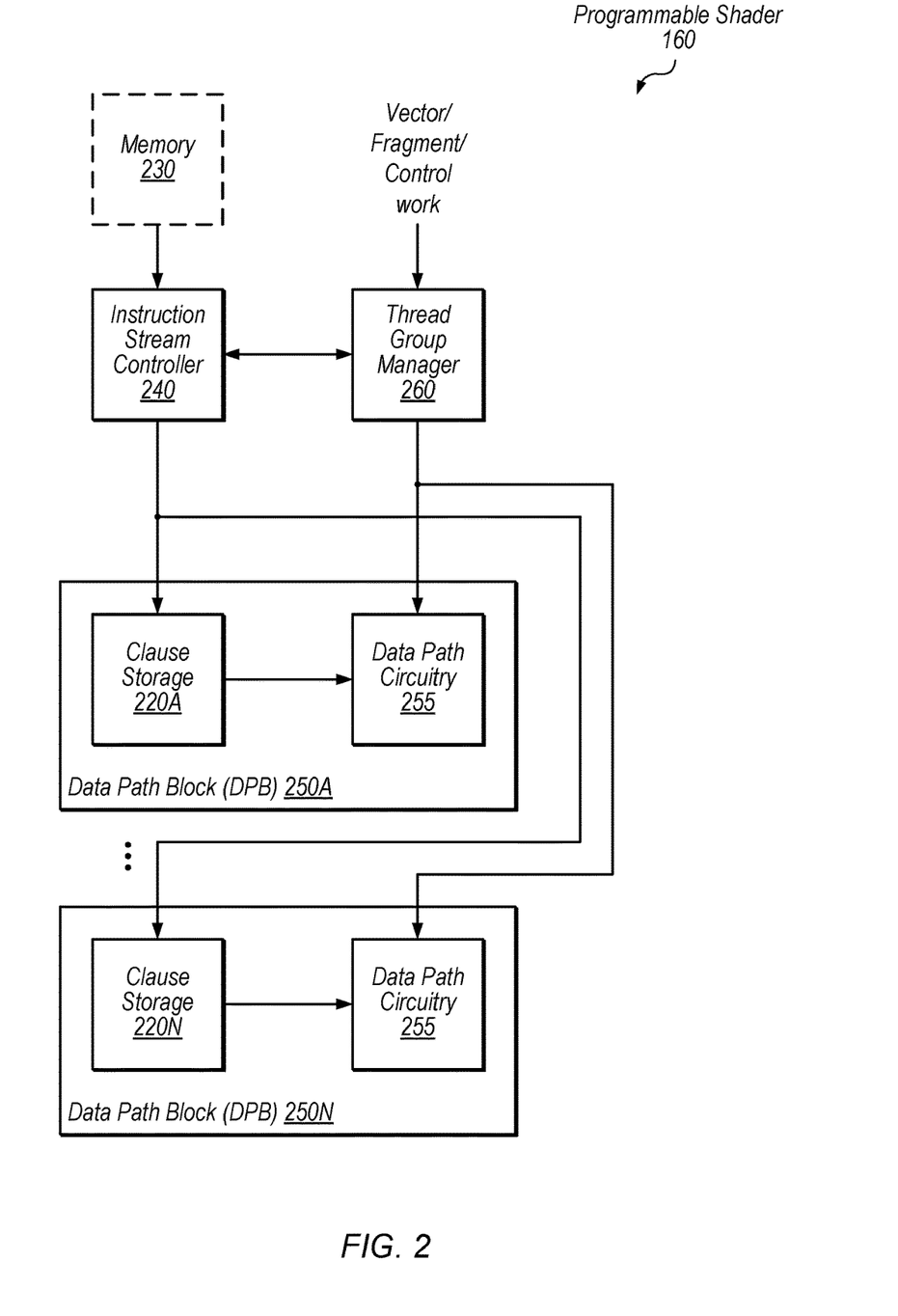
FIG. 2 is a block diagram illustrating a programmable shader in a graphics unit, according to some embodiments.

FIG. 2 shows processing elements included in a programmable shader 160, according to some embodiments. In the illustrated embodiment, programmable shader 160 includes instruction stream controller (ISC) 240, thread group manager (TGM) 260, and data path blocks (DPBs) 250A-N. In the illustrated embodiment, each DPB 250 includes clause storage 220 and one or more data path circuitry blocks 255. In other embodiments, a clause storage element 220 may be located outside of the DPB 250 and may, for example, provide clauses of instructions to multiple DPBs.

TGM 260, in some embodiments, is configured to receive and schedule at least one of the following types of work: vector work, fragment work, and/or compute work. In some embodiments, TGM 260 is configured to schedule work from among all three types. TGM 260 may receive such work from shader programs, for example, and schedule the work using clauses of instructions. In some embodiments, TGM 260 includes a scheduler that maintains a smaller list of active threads from among a larger group of pending threads. TGM 260, in some embodiments, is configured to invoke clauses of instructions for execution in parallel by data path circuitry blocks 255 in DPBs 250.

"Clause-based execution" involves the ability to execute a plurality of instructions as a group (i.e., once a clause has been invoked for execution, all instructions in the clause are executed, barring a condition such as a failed predicate condition, an exception, or other error). Clauses may include a single instruction, in some situations, but circuitry configured to perform clause-based execution ("clause-based execution circuitry") must be able to handle clauses that include a plurality of instructions. Thus, in some embodiments, clauses may contain varying numbers of instructions from a single instruction to a maximum number of supported instructions. The term "clause" may refer to the instructions themselves or may be used more generally to refer to both the instructions in the clause and corresponding input data, once input data has been assigned to the clause for execution.

Instruction stream controller 240, in some embodiments, is configured to group instructions into clauses and TGM 260 is configured to assign the clauses to one or more sets of execution hardware for parallel execution. For example, a particular clause of M instructions may be assigned to a "SIMD group" or "thread group" (these terms are used interchangeably herein) to be executed using N execution modules (e.g., ALUs) in parallel (i.e., such that each of the M instructions is executed by N different execution modules using potentially different input data, e.g., for different pixels on a screen). Further, the same clause may executed multiple times within the same instruction stream and/or be executed by different instruction streams. Although various embodiments disclosed herein use SIMD execution, similar techniques may be implemented in non-SIMD embodiments. In these embodiments, an instruction stream identifier may be used in place of a SIMD group identifier, for example.

Figure 3:
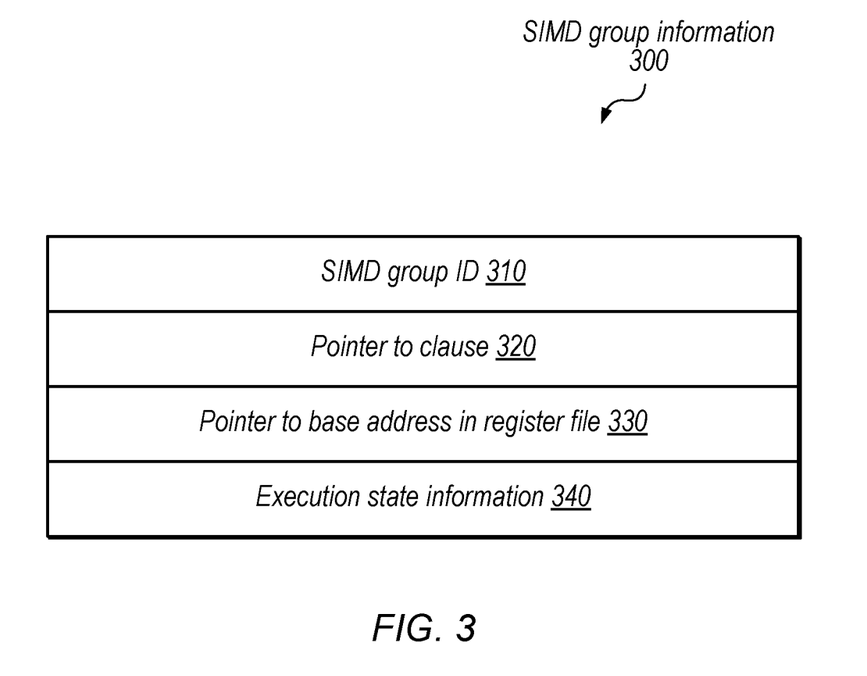
FIG. 3 is a block diagram illustrating exemplary SIMD group information, according to some embodiments.

In some embodiments, for a given clause of instructions, TGM 260 is configured to provide at least the information 300 shown in FIG. 3, to execution circuitry (e.g., DPBs 250A) for parallel execution: a SIMD group ID 310, a pointer 320 to relevant instructions (e.g., a pointer to the clause), a pointer 330 to a base address in a register file that stores operands for execution instances associated with the SIMD group ID, and execution state information 340. Execution state information 340 may include information relating to conditional execution of predicated instructions, for example.

As used herein, the term "instruction stream" is intended to be construed according to its well-understood meaning, which includes a set of instructions that make up a program and share state information. In single instruction single data implementations, an instruction stream corresponds to a thread or a program. In SIMD implementations, multiple execution instances with different input data may be grouped into the same instruction stream (e.g., because the same program is executed for all of the grouped execution instances). For example, consider the following two clauses of instructions:

Clause A:

$R1=R2+R3$ $R4=R5-R6$ $R7=R1*R4$

Clause B:

$R3=R7*R7+R1$ $R2=R5+R6$ $R3=R3*R2$

Note that these clauses of instructions may be executed for multiple different groups of input data (e.g., for different SIMD groups). In this example, each execution instance in a SIMD group may have its own set of registers R0-R7 which may store different data (e.g., for shader operations, each execution instance may operate on data for a pixel). Each instance may be assigned a SIMD group ID that is also assigned to the other instances in the same group. Consider, for this example, two SIMD groups, SIMD group X and SIMD group Y. When clauses A and B are executed for the same set of instances that make up SIMD group X, all six instructions are executed as part of the same instruction stream. In contrast, when clause A is executed to operate on data for SIMD group X and clause B is executed to operate on data for SIMD group Y, then the execution of these clauses corresponds to different instruction streams. Note that instances in the same instruction stream may not execute exactly the same instructions. For example, in predicated execution some instructions may be predicated off for one or more instances when their predicate condition is not met and predicated on for one or more other instances.

Referring again to FIG. 2, instruction stream controller 240, in the illustrated embodiment, is configured to form clauses of instructions, fetch clauses of instructions from memory 230 (which may or may not be included in the programmable shader 160), and provide fetched clauses of instructions to a clause storage element 220 corresponding to the appropriate DPB 250 for execution. In some embodiments, instruction stream controller 240 is configured to build streams of instructions, where a stream is a list of clauses and may be configured to cache streams of instructions. Instructions may be cached at multiple levels in a cache hierarchy, including clause storage element 220, in ISC 240 (not shown) and/or other levels in graphics unit 150. In some embodiments, instructions are cached at clause granularity at the level of clause storages 220 and cached at stream granularity at one or more higher levels.

DPBs 250, in the illustrated embodiment, each include clause storage element 220 configured to store clauses of instructions and data path circuitry 255 configured to execute instruction clauses for different thread groups. Each instance of data path circuitry 255 may include parallel execution pipelines configured to execute SIMD groups. In the illustrated embodiment, execution circuitry is divided into different data path blocks and sets of data path circuitry, but this organization is included for illustrative purposes and is not intended to limit the scope of the present disclosure. In other embodiments, execution circuitry may be organized according to various appropriate configurations.

Exemplary Execution Circuitry and State Information

Figure 4:
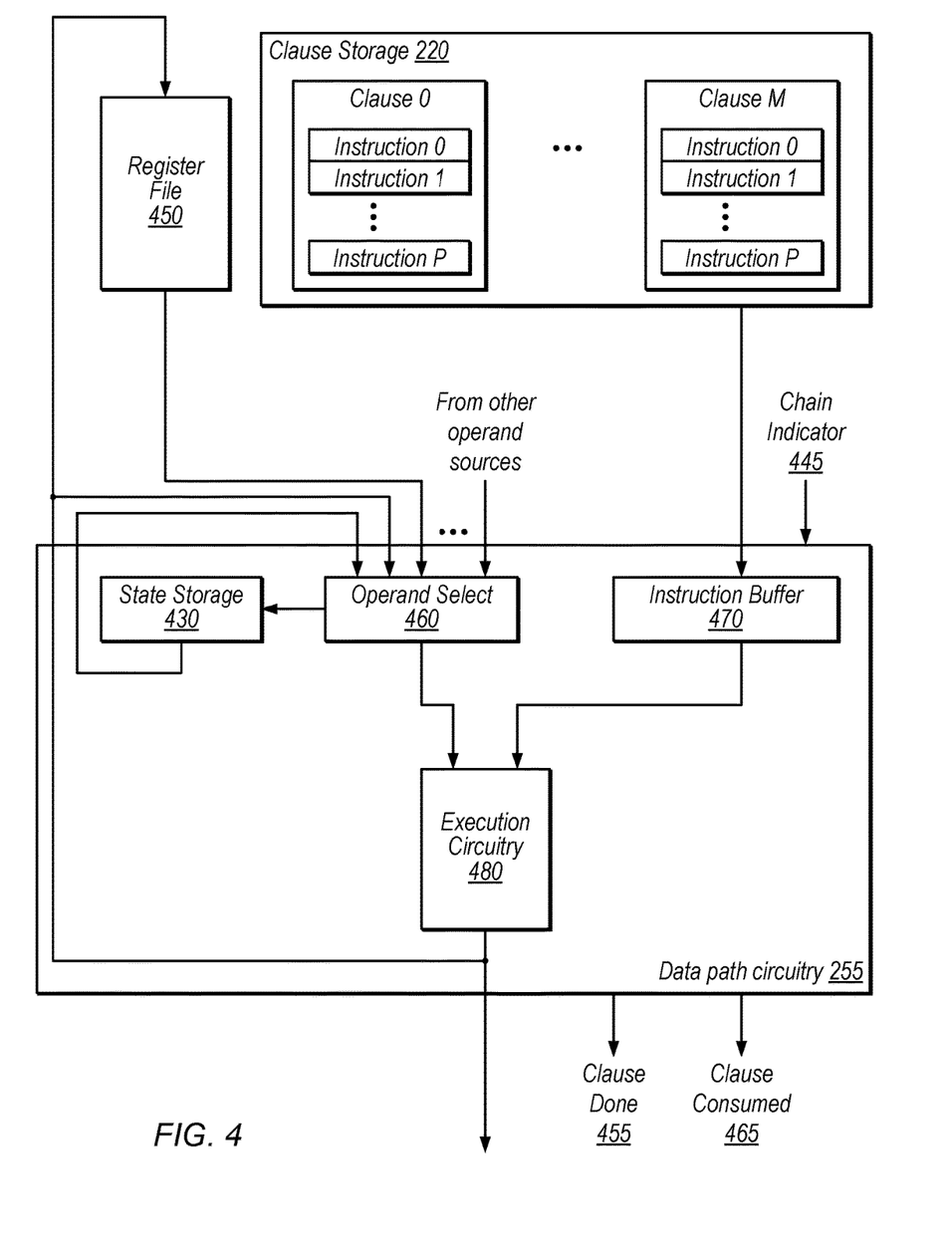
FIG. 4 is a block diagram illustrating exemplary data path circuitry that includes execution circuitry, according to some embodiments.

FIG. 4 is a block diagram illustrating a more detailed view of a portion of programmable shader 160. In the illustrated embodiment, the portion includes clause storage 220, data path circuitry 255, and register file 450. In some embodiments, one or more of the illustrated processing elements are included in a data path block 250.

Clause storage element 220, in the illustrated embodiment, includes multiple entries, each configured to store a set of instructions in the same clause. In these embodiments, the number of instructions included in a given clause may vary from a single instruction to the maximum number of instructions available in an entry of clause storage 220. In different embodiments, clause storage 220 may include storage for different numbers of clauses. Each entry configured to store clauses may include storage for the maximum number of instructions per clause (a design parameter which may vary in different embodiments or may be programmable). For example, clause storage 220 may be configured to store two, four, eight, sixteen, etc. clauses of up to four, five, eight, sixteen, etc. instructions each. In some embodiments, clause storage 220 may be indexed using a clause ID having an appropriate number of bits to uniquely identify each stored clause (e.g., 4 bits if clause storage 220 is configured to store 16 clauses of instructions) and an instruction number having an appropriate number of bits to uniquely identify each instruction in a given clause (e.g., 4 bits if each clause is permitted to include up to 16 instructions). In some embodiments, the maximum number of clauses and the number of instructions per clause in clause storage 220 may be configurable. For example, clause storage may operate in a first mode with four clauses of four instructions each, a second mode with eight clauses of two instructions each, etc.

In some embodiments, clause storage 220 implements a large number of read ports to provide instructions to data path circuitry. For example, in some embodiments, clause storage 220 includes a read port for each instruction buffer that it services (e.g., there may be an instruction buffer for each virtual pipe). In order to provide a sufficient number of read ports, the entries in clause storage 220 are implemented using latches and/or flip-flops, in some embodiments. In some embodiments, clause storage 220 is accessed by changing an address on one or more read multiplexers (not shown). In the illustrated embodiment, clause storage 220 is the lowest level of instruction storage in a cache/memory hierarchy for storing instruction data (other higher levels may include one or more caches in ISC 240, memory 230, etc.). Storing instructions at the clause granularity, at the lowest level, may reduce power consumption by allowing clauses to be executed multiple times for different thread groups, in some embodiments.

Register file 450, in the illustrated embodiment, is configured to store operands for execution circuitry 480. In some embodiments, entries in register file 450 are configured to store operands for multiple execution instances from the same SIMD group. In the illustrated embodiment, operands are also available to data path circuitry 255 from other sources (e.g., from a memory hierarchy).

Data path circuitry 255, in the illustrated embodiment, includes state storage circuitry 430, operand select circuitry 460, instruction buffer 470, and execution circuitry 480. In some embodiments, each data path block 250 includes multiple sets of data path circuitry 255.

Operand select circuitry 460, in the illustrated embodiment, is configured to select operands for execution circuitry 480 from one or more sources based on control signaling. In the illustrated embodiment, sources include state storage 430 (which may include an operand cache), register file 450, results forwarded from execution circuitry 480, and/or other operand sources.

Instruction buffer 470, in the illustrated embodiment, is configured to store instructions for execution by execution circuitry 480. Instruction buffer 470 may store whole clauses at a time or may store a portion of a clause.

Execution circuitry 480, in some embodiments, includes execution units configured to perform operations specified by instructions in parallel for SIMD groups. Thus, execution circuitry 480 may include one or more ALUs, floating-point units, etc. which may be assigned to a given execution instance or shared among execution instances in a SIMD group. Execution circuitry 480 may include slots for execution of multiple SIMD groups during a given time interval, as discussed in further detail below. In the illustrated embodiment, results from execution circuitry 480 are forwarded to operand select circuitry 460, sent to register file 450, and/or sent to other portions of graphics unit 150.

State storage 430, in the illustrated embodiment, includes an operand cache configured to store operands for execution circuitry 480 (which may reduce power consumed accessing register file 450, for example). Thus, state storage is configured to receive and store selected operands from operand select circuitry 460 in certain conditions and provide cached operands to operand select circuitry 460. This may reduce power consumption relative to retrieving operands from register file 450, for example.

In some embodiments, state storage 430 also includes a predicate register (not explicitly shown) configured to store information that is used to determine whether or not to execute instructions during predicated execution. Predicated execution is a well-known execution paradigm in which possible branch paths are coded inline, but some instructions execute while others do not (based on evaluation of predicate conditions). In some embodiments, the predicate register includes a bit for each execution instance that indicates whether or not the instance should execute.

Although operand cache information and predicate information are provided herein as examples of state information, these examples are not intended to limit the scope of the present disclosure. In other embodiments, similar techniques may be used to for various types of state information that are maintained at low level execution circuitry for clauses.

Depending on whether clauses fetched from clause storage 220 are in the same instruction stream, it may be desirable to flush state storage 430 between clauses. This may include, for example, storing predicate information in another storage element and/or storing operands from an operand cache in register file 450. This may allow state storage 430 to be used by another clause from a different instruction stream while keeping the information from the finished clause for use by later clauses from the same instruction stream. Conversely, if consecutive clauses are from the same instruction stream, it may be preferable to maintain state storage 430 without flushing, e.g., to reduce power consumption.

In the illustrated embodiment, data path circuitry 255 is configured to receive a clause chain indicator 445. As used herein "chaining" clauses refers to maintaining state information as valid between clause as opposed to flushing and invalidating state information between clauses. In the illustrated embodiment, this indicator signals that another clause from the same instruction stream will be assigned to data path circuitry 255. In some embodiments, TGM 260 is configured to generate this signal. In some embodiments, graphics unit 150 is configured to assert chain indicator 445 in response to determining that consecutive clauses assigned to a particular set of data path circuitry 225 have the same SIMD group ID 310. In some embodiments, making this determination early in the overall pipeline may allow data path circuitry 255 to refrain from flushing state storage 430 when a previous clause is finished, based on assertion of chain indicator 445. In some embodiments, clause chain indicator 445 is a hint rather than a command and data path circuitry 255 is configured to independently determine whether to chain as SIMD groups arrive. Comparing SIMD group IDs at this stage may be a low energy implementation and may avoid comparison of SIMD group IDs multiple times.

In the illustrated embodiment, data path circuitry 255 is configured to output clause done signal 455 and clause consumed signal 455. In some embodiments, clause done signal 455 indicates that a clause has finished execution.

TGM 260, in some embodiments, is configured to send more work to data path circuitry 255 based on assertion of the clause done signal 455. In some embodiments, data path circuitry 255, when not chaining with an incoming clause (where "chaining" refers to maintaining state information rather than flushing it), is configured to send clause done signal 455 after it has flushed state information. In some embodiments, data path circuitry 255 is configured to assert clause done signal 455 earlier when chaining, e.g., because the next clause can proceed without waiting for the flush. Speaking generally, clause done signal may indicate that execution results from the clause being executed have been safely committed to the architectural state. Therefore, clause done signal 455 can be sent earlier when chaining because the architectural state of the processor is correct for the incoming clause without needing to flush state information. This may allow TGM 260 to assign more work to data path circuitry 255 earlier, which may increase overall utilization of data path circuitry 255.

In some embodiments, clause consumed signal 455 indicates that data path circuitry 255 has read the last instruction in a clause from clause storage 220 into instruction buffer 470. In some embodiments, TGM 260 is configured to then use the corresponding entry in clause storage 220 to store a new instruction clause if needed. This may avoid keeping clauses in clause storage 220 longer than needed, in some embodiments and allow bringing in new clauses sooner.

In some embodiments, data path circuitry 255 is configured to execute multiple instructions streams in parallel. For example, execution circuitry 480 may be configured to process instructions from different streams in different pipeline stages. U.S. patent application Ser. No. 13/956,299 filed Jul. 31, 2013 discusses examples of such techniques. Data path circuitry 255 may be configured with multiple "slots" that each supports an instruction stream being executed and its respective state storage 430, instruction buffer 470, etc. In some embodiments, when TGM 260 sends a SIMD group for execution, it is configured to indicate which slot is assigned for the SIMD group. In some embodiments, when sending a SIMD group for execution by a particular instance of data path circuitry 255, if there is a slot with the same SIMD group ID, then TGM 260 is configured to assign the incoming SIMD group to the same slot. This may improve the likelihood of being able to chain clauses, in various embodiments.

Having multiple slots may allow execution circuitry 480 to stay busy, especially for short clauses. For example, one slot may just be finishing execution and flushing state information, another may be in the middle of execution, and another just beginning to fetch a clause.

Further, in some embodiments a given data path block 250 includes multiple instances of data path circuitry 255 and is configured to execute clauses for SIMD groups using multiple virtual pipes. TGM 260 may indicate which virtual pipe should execute for a SIMD group when it sends work to data path block 250. In some embodiments, if there is a SIMD group being executed for a given instruction stream, TGM 260 is configured to send any additional SIMD groups from the same instruction stream to the same virtual pipe. Different virtual pipes may or may not share different types of execution resources in various embodiments. As discussed above, each virtual pipe may execute multiple slots.

In some embodiments, programmable shader 160 includes storage circuitry configured to maintain a group work queue data structure for each virtual pipe. In some embodiments, for data path circuitry 255 configured to execute N slots, the queue structure is configured to store at least N entries. In some embodiments, each entry includes a predicate register configured to store predicate information for that slot. In some embodiments, each entry includes a slot ID. In some embodiments an operand cache is shared among the slots and each operand cache entry includes a field indicating the slot that owns that entry. The field may be used to flush operand cache entries for the appropriate SIMD group, in some embodiments. In other embodiments each slot may have a corresponding dedicated operand cache.

In some embodiments, the queue is configured to maintain an ordering of slots based on when a SIMD group being executed was received. In some embodiments, if an incoming SIMD group has the same SIMD group ID as an executing SIMD group, and the executing SIMD group cannot be chained (e.g., because it has already begun flushing its state), then the incoming SIMD group may stall until the executing SIMD group is completely finished. If the incoming SIMD group has the same SIMD group ID as an executing SIMD group, but the matching SIMD group is not currently the youngest SIMD group, then the incoming SIMD group may stall until the prior matching SIMD group is finished, in some embodiments.

In some embodiments, for an incoming SIMD group that does not chain with a prior SIMD group, programmable shader 160 is configured to load new starting state for that SIMD group into state storage 430. In some embodiments, for an incoming SIMD group that is chained, existing state may be retained, as discussed above.

In some embodiments, the queue structure allows fetching and execution of one instruction per clock whether or not SIMD groups are chained. In some embodiments, the clause done signal 455 may allow queue entries to be allocated for new work as soon as a clause is finished. In some embodiments, data path circuitry 255 is configured to assert a hint signal that indicates how full the queue structure is. For example, the hint signal may have values that specify when the queue has one open entry and when it is full. Each virtual pipe may have a corresponding hint signal for its respective queue. This may allow TGM 260 to efficiently schedule processing work for different virtual pipes.

Exemplary Method

FIG. 5 is a flow diagram illustrating one exemplary embodiment of a method 500 for determining whether to chain clauses of instructions. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 510.

At 510, in the illustrated embodiment, execution circuitry (e.g., data path block 250, data path circuitry 255, and/or execution circuitry 480) receives clauses of instructions that specify a set of operations and receives corresponding groups of input data for the clauses. The groups of input data may each correspond to a SIMD group. In the illustrated embodiment, each the groups of input data includes multiple sets of input operand values for the set of operations. For example, for a given instruction in the clause, one set of input data may be for a first execution instance and another set of input data may be for another execution instance, wherein the execution instances are grouped for SIMD execution. In some embodiments, the received clause and group of input data are assigned to a particular virtual execution pipeline and slot. In some embodiments, the received information includes all or a portion of the information shown in FIG. 3. Therefore, receiving a clause of instructions may include receiving a pointer to a clause of instructions and accessing the instructions using the pointer.

At 520, in the illustrated embodiment, execution circuitry 480 performs, in parallel, operations in the set of operations using the multiple sets of input operand values. This may be referred to as SIMD execution.

At 530, in the illustrated embodiment, state storage 430 stores state information for processed clauses. This may include cached operands, predicate information, etc.

At 540, in the illustrated embodiment, scheduling circuitry sends instructions from a first clause and corresponding groups of input data for execution. The first clause may specify the at least a portion of the set of operations performed in method element 520. Thus, method elements 510-530 describe clause-based execution generally while method elements 540-560 explain operations for specific first and second ones of the clauses.

At 550, in the illustrated embodiment, the scheduling circuitry indicates, prior to sending instructions and input data of a second clause for execution, whether the second clause and the first clause are assigned to operate on groups of input data corresponding to the same input stream. In some embodiments, this determination is made based on whether the groups of input data have the same SIMD group ID 310.

At 560, in the illustrated embodiment, execution circuitry determines, based on the indication, whether to maintain stored state information for the first clause as valid for use by the second clause. In some embodiments, if the first and second clauses are assigned to operate on groups of input data for different instruction streams, then the execution circuitry flushes the state information to another storage location and invalidates the state information, which allows new state information to be stored for the second clause. In some embodiments, if the first and second clauses are assigned to operate on groups of input data for a common instruction stream, then the execution circuitry maintains the state information as valid and uses the state information for execution of the second clause.

In various embodiments, the disclosed techniques may improve performance and/or reduce power consumption of SIMD processing, relative to conventional SIMD techniques.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 680, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

In some embodiments, various elements of device 600 may include clock gaters arranged hierarchically, including various series of DET clock gaters coupled to deliver clock signals to different portions of a clock tree. The disclosed techniques may reduce switching power consumption in device 600, balance the clock delay to different portions of device 600, reduce errors in device 600, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1A, 1B, 2, 4, and/or 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   execution circuitry configured to receive clauses of instructions and groups of input data for the clauses, wherein the clauses specify respective sets of operations, wherein each the groups of input data includes multiple sets of input operand values for a corresponding set of operations, and wherein the execution circuitry is configured to perform, in parallel, operations in the sets of operations using the multiple sets of input operand values;
   one or more storage elements configured to store state information for groups of input data based on execution of corresponding clauses by the execution circuitry; and
   scheduling circuitry configured to:
      send instructions of a first clause and corresponding input data for execution by the execution circuitry; and indicate, prior to sending instructions and input data of a second clause to the execution circuitry for execution, whether the second clause and the first clause are assigned to operate on groups of input data corresponding to a common instruction stream, wherein a first value of the indication indicates that the first and second clause operate on groups of input data corresponding to a common instruction stream and wherein a second value of the indication indicates that the first and second clause operate on groups input data corresponding to different instructions streams;

wherein the apparatus is configured to determine, based on the indication, whether to maintain as valid, for use by the second clause, stored state information for the first clause in the one or more storage elements.

2. The apparatus of claim 1, wherein the apparatus is configured to flush and invalidate the stored state information in response to an indication that the first clause and the second clause are assigned to operate on groups of input data corresponding to different instruction streams.

3. The apparatus of claim 1, wherein the apparatus is configured to maintain the stored state information as valid in response to an indication that the first clause and the second clause are assigned to operate on groups of input data corresponding to a common instruction stream.

4. The apparatus of claim 1, wherein the state information includes cached operands.

5. The apparatus of claim 1, wherein the state information includes predicate information.

6. The apparatus of claim 1, wherein the execution circuitry is configured to assert a signal indicating that instructions in a clause have finished executing and that the architectural state of apparatus has been updated based on executing the clause, and wherein the scheduling circuitry is configured to allocate execution resources for a subsequent clause based on the signal.

7. The apparatus of claim 1, wherein the execution circuitry is configured to assert a signal indicating that all instructions in a particular clause have been fetched from a clause storage element and wherein, in response to the signal, the scheduling circuitry is configured to store another clause in a corresponding entry of the clause storage element.

8. The apparatus of claim 1, wherein the execution circuitry is configured with multiple slots for parallel execution of different groups of input data, wherein the scheduling circuitry is configured to assign groups of input data from the common instruction stream to the same slot.

9. A non-transitory computer readable storage medium having stored thereon design information that specifies a design of at least a portion of a hardware integrated circuit in a format recognized by a semiconductor fabrication system that is configured to use the design information to produce the circuit according to the design, including:

execution circuitry configured to receive clauses of instructions and SIMD groups of input data, wherein the clauses specify respective sets of operations, wherein the execution circuitry is configured to perform, in parallel, operations in the clauses of instructions using the SIMD groups of input data;

one or more storage elements configured to store state information for groups of input data based on execution of corresponding clauses by the execution circuitry; and scheduling circuitry configured to:
send instructions of a first clause and corresponding input data for execution by the execution circuitry; and indicate, prior to sending instructions and input data of a second clause to the execution circuitry for execution, whether the second clause and the first clause are assigned to operate on SIMD groups corresponding to the same instruction stream, wherein a first value of the indication indicates that the first and second clause operate on groups of input data corresponding to a common instruction stream and wherein a second value of the indication indicates that the first and second clause operate on groups input data corresponding to different instructions streams;

wherein the design information further specifies that the circuit is configured to determine, based on the indication, whether to maintain as valid, for use by the second clause, stored state information for the first clause in the one or more storage elements.

10. The non-transitory computer readable storage medium of claim 9, wherein the operations further comprise:
flushing the stored state information in response to an indication that the first clause and the second clause are assigned to operate on groups of input data corresponding to different instruction streams.

11. The non-transitory computer readable storage medium of claim 9, wherein the state information includes cached operands.

12. The non-transitory computer readable storage medium of claim 9, wherein the state information includes predicate information.

13. The non-transitory computer readable storage medium of claim 9, wherein the operations further comprise:
asserting a signal indicating that instructions in a clause have finished executing; and
allocating resources for a subsequent clause based on the asserted signal.

14. The non-transitory computer readable storage medium of claim 9, wherein the operations further comprise:
asserting a signal indicating that all instruction in a particular clause have been fetched from a clause storage element; and
storing another clause in a corresponding entry of the clause storage element in response to the signal.

15. The non-transitory computer readable storage medium of claim 9, wherein the design information specifies that the execution circuitry is configured with multiple slots for parallel execution for different groups of input data and that the scheduling circuitry is configured to assign groups of input data from the same instruction stream to the same slot.

16. A method, comprising:
receiving, by execution circuitry, clauses of instructions and groups of input data, wherein the clauses specify respective sets of operations and wherein each of the groups of input data includes multiple sets of input operand values for a corresponding set of operations;
performing, by the execution circuitry in parallel, operations in the set of operations using the multiple sets of input operand values;
storing, by one or more storage elements, state information for groups of input data based on execution of corresponding clauses by the execution circuitry;
sending, by scheduling circuitry, instructions of a first clause and corresponding groups of input data for execution by the execution circuitry;

indicating, by the scheduling circuitry prior to sending instructions and input data of a second clause to the execution circuitry for execution, that the second clause and the first clause are assigned to operate on groups of input data corresponding to a common instruction stream;

determining, based on the indication, to maintain as valid, for use by the second clause, stored state information for the first clause in the one or more storage elements;

indicating, by the scheduling circuitry prior to sending instructions and input data of a third clause to the execution circuitry for execution, that the third clause and the second clause are assigned to operate on groups of input data corresponding to different instruction streams; and determining, based on the indication, to flush stored state information for the second clause in the one or more storage elements.

17. The method of claim 16, wherein the state information includes one or more cached operands.

18. The method of claim 16, wherein the state information includes predicate information.

* * * * *